S. Terry
Corn Sheller.

Nº 71551        Patented Nov. 26, 1867.

Witnesses.        Inventor.

Simeon Terry

United States Patent Office.

SIMEON TERRY, OF BOSCAWEN, NEW HAMPSHIRE.

Letters Patent No. 71,551, dated November 26, 1867.

---

IMPROVEMENT IN CORN-SHELLERS.

---

The Schedule referred to in these Letters Patent and making part of the same.

---

TO ALL WHOM IT MAY CONCERN:

Be it known that I, SIMEON TERRY, of Boscawen, in the county of Merrimac, and in the State of New Hampshire, have invented certain new and useful Improvements in Corn-Sheller, and do hereby declare that the following is a full, clear, and exact description thereof, reference being had to the accompanying drawings, and to the letters of reference marked thereon, making a part of this specification.

Figure 1:
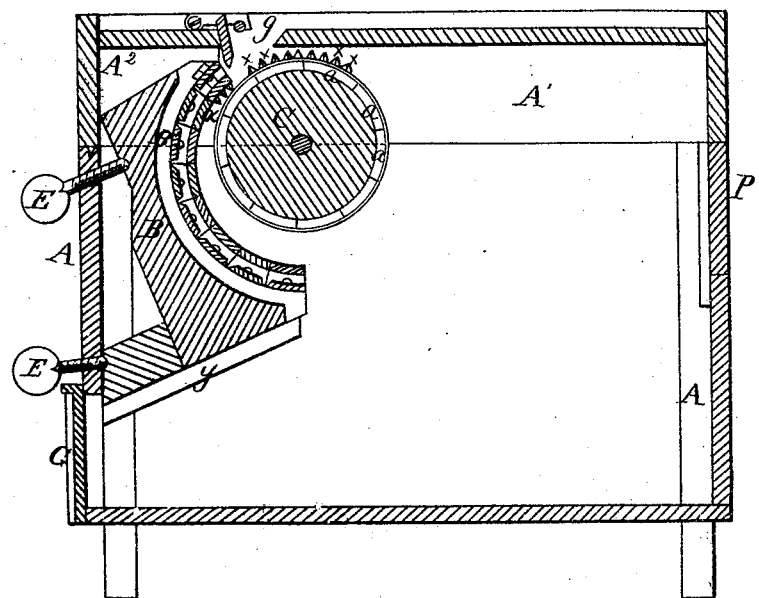

Figure 1 represents a longitudinal vertical section.

Figure 2:

Figure 2, a view of one of the staves and the apron.

Figure 3:
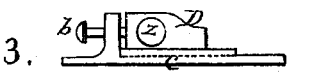

Figure 3, a side view of the journal-bearing through which the journals on the cylinder are passed.

Figure 4:
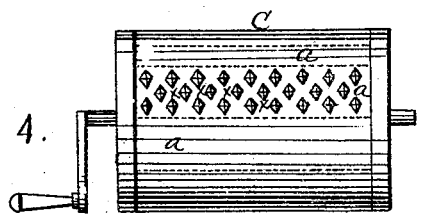

Figure 4, a view of the cylinder.

In the annexed drawings, A represents a box of any suitable shape, provided with a cover, $A^1$, and a section of a cover, $A^2$. C represents the cylinder, which is placed horizontally or otherwise upon the upper part of the box. The cylinder A is usually of wood, having its entire outer face covered with a series of metallic staves, $a\ a$, made to fit neatly upon it. Each of these staves is provided with an indefinite number of spurs, $x\ x\ x$, which are made in a pyramidal form, so as to completely and effectually clean the corner from its cob. B represents the apron-block, which is secured to the end or other suitable part of the box by means of ways $y$. This apron-block is made in a curved form, as shown, and has a wide groove in its centre. Upon the outer portion of the block is secured the apron B′, which forms springs by means of its being secured upon the ends of the block and extending over the wide groove. This apron is composed of a series of staves, B′, formed in a concave manner, so as to correspond with the convexity of the cylinder A. Each of the staves has a raised point, $e$, on its centre, and on to which point are bolted the metal staves $a'$, which are provided with teeth or spurs, $x'$, similar to those, $x$, on the cylinder. These metal staves being attached to the points $e$ form springs, so as to adjust themselves to the formation of the cord and the size thereof. E E represent set-screws, which operate the apron-block B, with its apron, so as to allow the same to be the distance required from the cylinder. Between the covers $A^1\ A^2$ there is a space, $g$, left over the cylinder for the purpose of passing the corn.

This sheller may be operated by hand or other power, and is provided with suitable doors, G and P, for the egress of the corn and cobs. I may use springs in the rear of the block B for adjusting the same, if preferred.

Having thus fully described my invention, what I claim as new, and desire to secure by Letters Patent, is—

In combination with box A, as constructed, the adjustable apron-block B, (by the screws E E,) the apron B′, with its metal staves, $a'$, secured upon the raised point $e$, arranged and operating with the cylinder C, in the manner and for the purposes set forth.

In testimony that I claim the foregoing, I have hereunto set my hand and seal, this 29th day of July, 1867.

SIMEON TERRY. [L. S.]

Witnesses:
 GEO. E. JENKS,
 L. D. STEVENS.